(12) United States Patent
Sugiyama

(10) Patent No.: US 9,378,358 B2
(45) Date of Patent: Jun. 28, 2016

(54) PASSWORD MANAGEMENT SYSTEM

(71) Applicant: DeNA Co., Ltd., Tokyo (JP)

(72) Inventor: Toshiharu Sugiyama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/521,643

(22) Filed: Oct. 23, 2014

(65) Prior Publication Data

US 2015/0254453 A1    Sep. 10, 2015

(30) Foreign Application Priority Data

Mar. 7, 2014   (JP) ................................ 2014-045494

(51) Int. Cl.
| | |
|---|---|
| *G06F 21/00* | (2013.01) |
| *G06F 21/46* | (2013.01) |
| *H04L 29/06* | (2006.01) |
| *H04L 9/32* | (2006.01) |

(52) U.S. Cl.
CPC ............... *G06F 21/46* (2013.01); *H04L 9/3226* (2013.01); *H04L 63/083* (2013.01)

(58) Field of Classification Search
CPC ..... G06F 21/46; H04L 9/0643; H04L 9/3223; H04L 9/3226; H04L 63/083
See application file for complete search history.

(56) References Cited

U.S. PATENT DOCUMENTS

| | | | |
|---|---|---|---|
| 2009/0150677 A1* | 6/2009 | Vedula ..................... | G06F 21/46 713/183 |
| 2009/0150971 A1* | 6/2009 | Vedula et al. ...................... | 726/1 |
| 2010/0218233 A1* | 8/2010 | Henderson et al. ................ | 726/1 |
| 2012/0284783 A1* | 11/2012 | Jakobsson ............... | G06F 21/46 726/6 |
| 2014/0230028 A1* | 8/2014 | Petty ................................. | 726/6 |

FOREIGN PATENT DOCUMENTS

JP    2004-280189    10/2004

OTHER PUBLICATIONS

Japanese Office Action mailed Apr. 30, 2014.

* cited by examiner

*Primary Examiner* — Daniel Potratz
(74) *Attorney, Agent, or Firm* — IPUSA, PLLC

(57) ABSTRACT

A password management system includes a character string conversion unit that converts an input character string to a character string different from the input character string using a predetermined arithmetic expression, the predetermined arithmetic expression being capable of giving a same converted result for a same character string and capable of converting a character string such that a plurality of original character string candidates exist for a converted character string; a password data storage unit that stores, for each user, a converted past password character string CPP that is a converted state of a past password character string PP of the user using the predetermined arithmetic expression and is different from the past password character string PP; and a strength determining unit that determines strength of a password.

11 Claims, 9 Drawing Sheets

FIG.5

| USER ID | CURRENT PASSWORD | PAST PASSWORD | | | |
|---|---|---|---|---|---|
| | | 1 GENERATION AGO | 2 GENERATION AGO | ... | n GENERATION AGO |
| a | ECP(a) | CPP1(a) | CPP2(a) | ... | CPPn(a) |
| b | ECP(b) | CPP1(b) | CPP2(b) | ... | CPPn(b) |
| ... | ... | ... | ... | ... | ... |
| c | ECP(c) | CPP1c | CPP2(c) | ... | CPPn(c) |
| ... | ... | ... | ... | ... | ... |

| TARGET | ARITHMETIC EXPRESSION | ... |
|---|---|---|
| CURRENT PASSWORD | E1 | ... |
| PAST PASSWORD | e | ... |
| : | : | ... |

FIG.7

| TARGET | ARITHMETIC EXPRESSION | ... |
|---|---|---|
| CURRENT PASSWORD | E1 | ... |
| PAST PASSWORD | e (E2→R1) | ... |
| : | : | ... |

FIG.8

| USER ID | CURRENT PASSWORD (32 digits) | PAST PASSWORD (r digits) | | | | |
|---|---|---|---|---|---|---|
| | | 1 GENERATION AGO | 2 GENERATION AGO | ... | n GENERATION AGO | |
| p001 | xxxxx----xxxxx | xxxx | xxxx | ... | xxxx | ... |
| p002 | xxxxx----xxxxx | xxxx | xxxx | ... | xxxx | ... |
| .. | .. | .. | .. | .. | .. | |
| p010 | xxxxx----xxxxx | xxxx | xxxx | ... | xxxx | ... |
| .. | .. | .. | .. | .. | .. | ... |

| USER ID | CURRENT PASSWORD | PAST PASSWORD | | | | | | | |
|---|---|---|---|---|---|---|---|---|---|
| | | 1 GENERATION AGO | | 2 GENERATION AGO | | ... | n GENERATION AGO | | ... |
| | | CHARACTER STRING | ARITHMETIC EXPRESSION | CHARACTER STRING | ARITHMETIC EXPRESSION | ... | CHARACTER STRING | ARITHMETIC EXPRESSION | ... |
| a | ECP(a) | CPP1(a) | e1 | CPP2(a) | e2 | ... | CPPn(a) | e2 | ... |
| b | ECP(b) | CPP1(b) | e1 | CPP2(b) | e1 | ... | CPPn(b) | e2 | ... |
| .. | .. | .. | .. | .. | .. | .. | .. | .. | .. |
| c | ECP(c) | CPP1(c) | e1 | CPP2(c) | e2 | ... | CPPn(c) | e2 | ... |
| .. | .. | .. | | | | | | | |

62

PASSWORD MANAGEMENT SYSTEM

CROSS-REFERENCE TO RELATED APPLICATION

The present application is based on and claims the benefit of priority of Japanese Priority Application No. 2014-045494 filed on Mar. 7, 2014, the entire contents of which are hereby incorporated by reference.

BACKGROUND OF THE INVENTION

1. Field of the Invention

The present invention relates to a password management system.

2. Description of the Related Art

Conventionally, in a system that requires a user to input a password for log-in, a mechanism as follows is known. In the mechanism, a past password that was previously set by the user but not currently used anymore is also stored. Then, when setting a new password, the user is warned or rejected if the user inputs a password that is the same as the past password as the new password (Patent Document 1, for example).

Here, in order to securely store passwords at a system side, each of the passwords may not be stored as clear text of an original password character string itself, but rather, may be stored as an encrypted password character string, which uniquely identifies the original password character string, obtained by encrypting the original password character string using a one-way function such as a hash function or the like. At this time, a method is known in which a random value called "salt", for example, a fixed value or the like is added to the original password character string, and then the value is encrypted using the one-way function. When this method is used, under circumstances that the calculated results obtained by using the one-way function are sufficiently random and it is ensured that collision of the calculated results does not occur for actual inputs, it is possible to verify a password of a user by performing the same calculation, and also it is almost impossible to obtain (reconstitute) the original password character string from the calculated result. Thus, even if the stored encrypted password character strings are leaked, it is almost impossible to obtain the original password character string.

However, even when an encrypted password character string is stored as a password and it is almost impossible to reconstitute an original password character string from the encrypted password character string at the that time, as described above, there may be a case that it becomes possible to reconstitute (infer) the original password character string from the encrypted password character string due to an improvement of calculation speed of computers or the like.

For example, recently, a rainbow attack of estimating an original password character string using a rainbow table is known. The rainbow table is a list of calculated results obtained by previously encrypting a plurality of arbitrary character strings using one-way function. When such an attack is performed, if the stored encrypted password character string is leaked, the original password character string may be inferred.

Even when an effective encrypted password character string is leaked from a system and an original password character string is inferred from the encrypted password character string, unauthorized access to the system can be prevented by taking a measure such as invalidating the encrypted password character string at the system from which the encrypted password character string is leaked. Further, as the technique of Patent Document 1 described above, even when past passwords of the user are stored in the system and the past passwords are leaked as well, unauthorized access to the system can be prevented because the past passwords are not effective in the system anymore.

However, recently, users register their passwords at a plurality of systems or sites. In such cases, many of the users register the same passwords or the passwords similar to each other at the plurality of systems or sites. Further, for example, a password that has been previously used at a system is sometimes still used as an effective password at another system. In such a case, if an encrypted password character string that was previously registered at a system is leaked and an original password character string is inferred, unauthorized access to another system may be performed using the inferred password character string.

PATENT DOCUMENT

[Patent Document 1] Japanese Laid-open Patent Publication No. 2004-280189

SUMMARY OF THE INVENTION

The present invention is made in light of the above problems, and provides a technique capable of preventing unauthorized accesses to other systems even when a password is leaked while storing data regarding past passwords in order to increase the strength of the password.

According to an embodiment, there is provided a password management system including a character string conversion unit that converts an input character string to a character string different from the input character string using a predetermined arithmetic expression, the predetermined arithmetic expression being capable of giving a same converted result for a same character string and capable of converting a character string such that a plurality of original character string candidates exist for a converted character string, the predetermined arithmetic expression including, as a part, encryption arithmetic expression capable of converting an input character string to an encrypted character string that uniquely identifies the input character string; a password data storage unit that stores, for each user, a converted past password character string CPP that is a converted state of a past password character string PP of the user using the predetermined arithmetic expression and is different from the past password character string PP; and a strength determining unit that determines strength of a password, wherein upon accepting input of a new password character string NP with an instruction of changing a current password, the character string conversion unit converts the new password character string NP to a converted input character string CNP different from the new password character string NP using the predetermined arithmetic expression or the encryption arithmetic expression, and wherein the strength determining unit determine strength of the new password character string NP based on the converted input character string CNP and the converted past password character string CPP of the user stored in the password data storage unit.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5 is a view illustrating an example of an internal structure of a password data storage unit of the embodiment;

FIG. 6 is a view illustrating an example of an internal structure of an arithmetic expression storage unit of the embodiment;

FIG. 7 is a view illustrating an example of an internal structure of an arithmetic expression storage unit of a specific example of the embodiment;

FIG. 8 is a view illustrating an example of an internal structure of a password data storage unit of a specific example of the embodiment;

FIG. 10 is a view illustrating another example of an internal structure of the password data storage unit of the specific example of the embodiment.

DETAILED DESCRIPTION OF THE PREFERRED EMBODIMENTS

Figure 1:
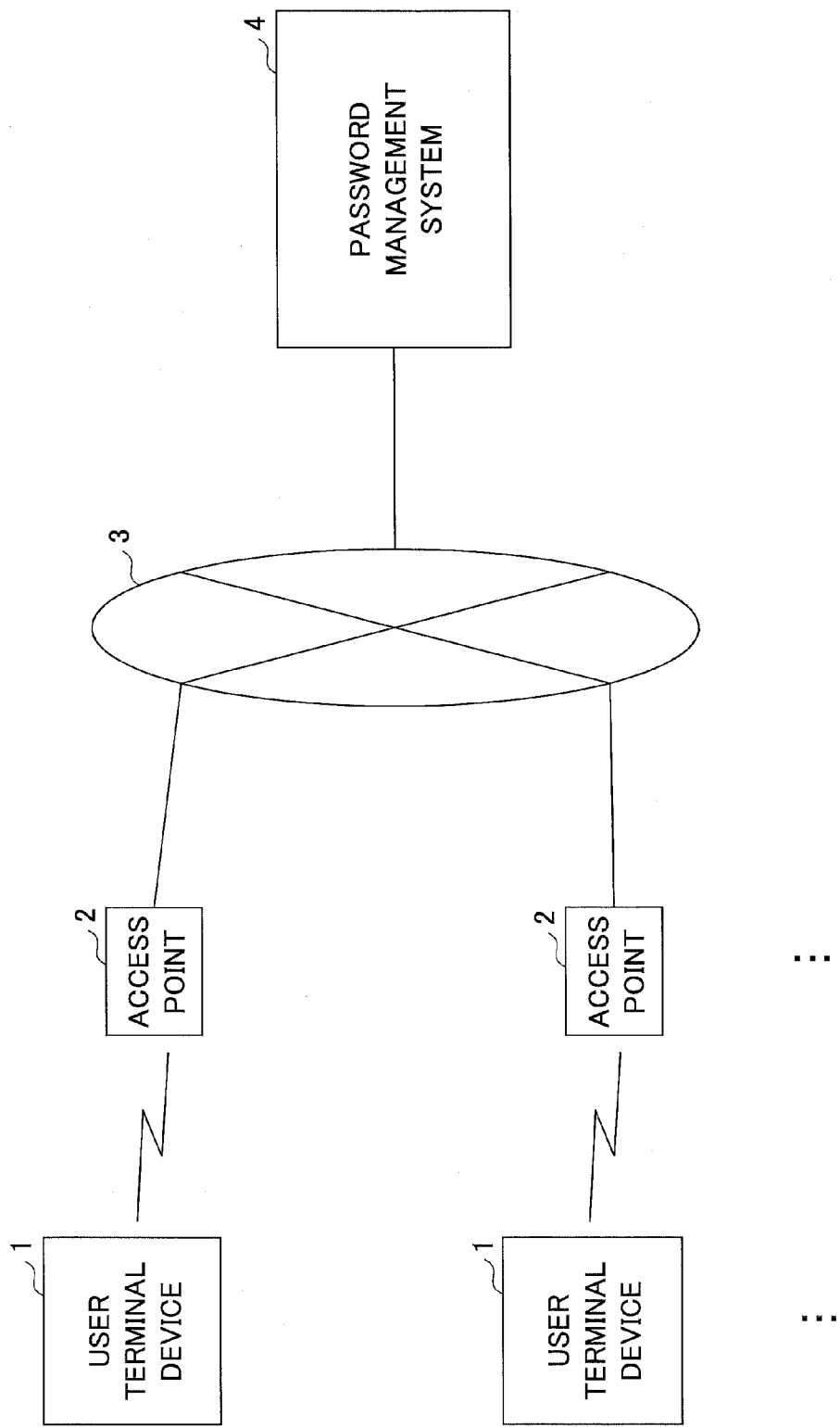
FIG. 1 is a block diagram illustrating an example of a network structure of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

FIG. 1 is a block diagram illustrating an example of a network structure of an embodiment.

The network structure includes a plurality of user terminal apparatuses 1 each being operated by a user, access points 2 such as a mobile station, a Wi-Fi station or the like and a password management system 4 that controls (manages) authentication or change of a password of a user. The password management system 4 is connected to the user terminal apparatuses 1 via a network 3 such as INTERNET or the like. The user terminal apparatus 1 may be a data processing apparatus such as a mobile phone, a smartphone, a game console, a personal computer, a touch pad, a digital book reader or the like.

Figure 2:
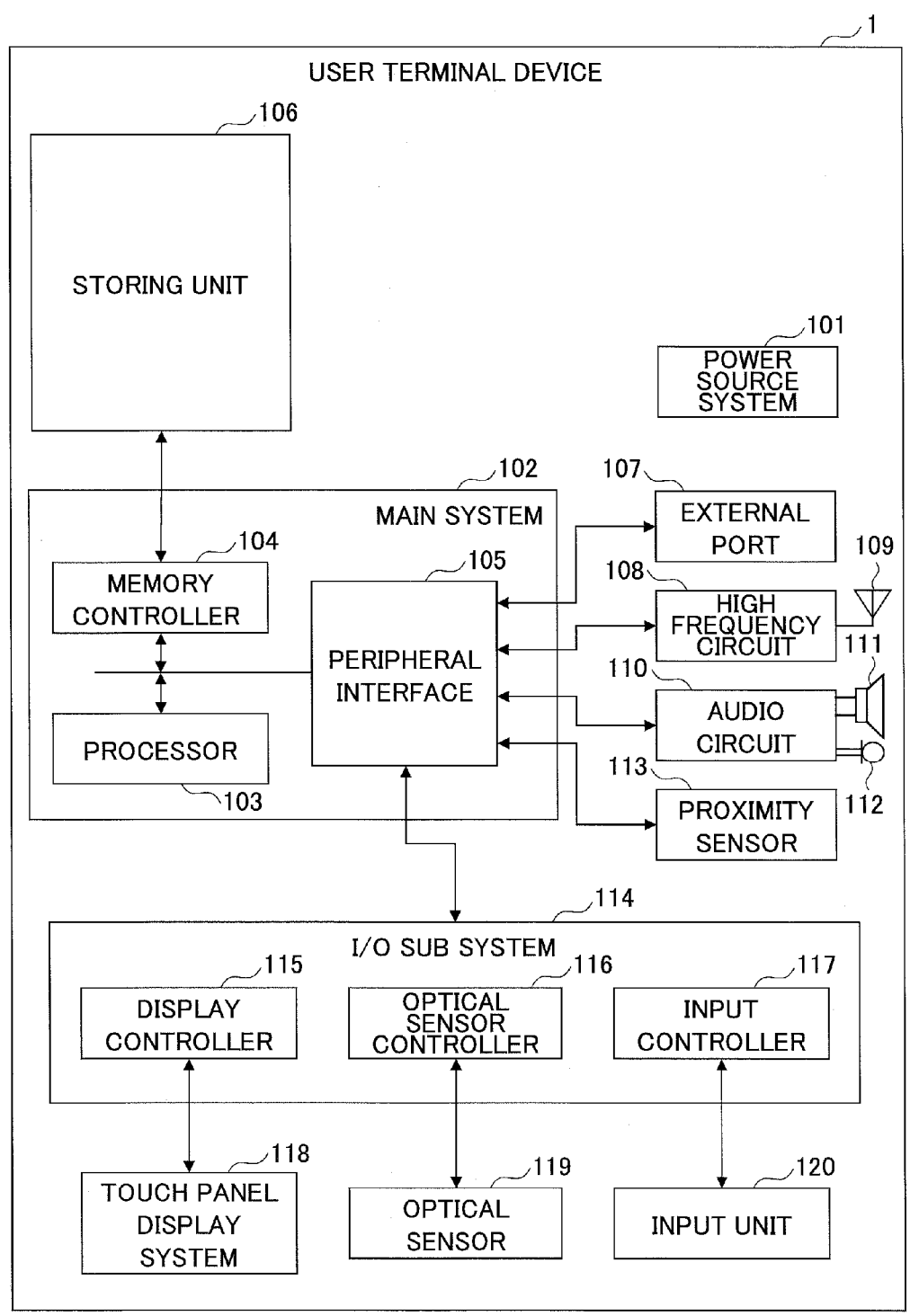
FIG. 2 is a block diagram illustrating an example of a hardware structure of a user terminal apparatus of the embodiment.

FIG. 2 is a block diagram illustrating an example of a hardware structure of the user terminal apparatus 1 of the embodiment.

The user terminal apparatus 1 includes a power source system 101, a main system 102, a storing unit 106, an external port 107, a high frequency circuit 108, an antenna 109, an audio circuit 110, a speaker 111, a microphone 112, a proximity sensor 113, an I/O sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116 and an input controller 117.

Figure 3:
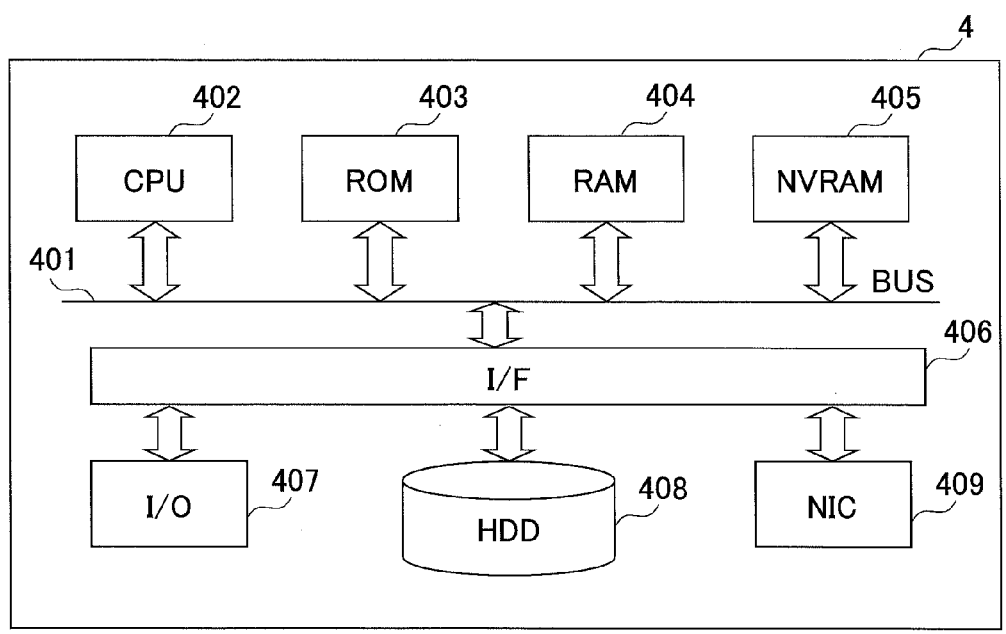
FIG. 3 is a block diagram illustrating an example of a hardware structure of a password management system of the embodiment.

FIG. 3 is a block diagram illustrating an example of a hardware structure of the password management system 4 of the embodiment.

The password management system 4 includes a Central Processing Unit (CPU) 402, a Read Only Memory (ROM) 403, a Random Access Memory (RAM) 404, a Non-Volatile Random Access Memory (NVRAM) 405 and an Interface (I/F) 406, which are connected to a system bus 401. The password management system 4 further includes an Input/Output Device (I/O) 407 such as a keyboard, a mouse, a monitor, a Compact Disk/Digital Versatile Disk (CD/DVD) drive or the like, a Hard Disk Drive (HDD) 408 and a Network Interface Card (NIC) 409, which are connected to the I/F 406, or the like.

Figure 4:
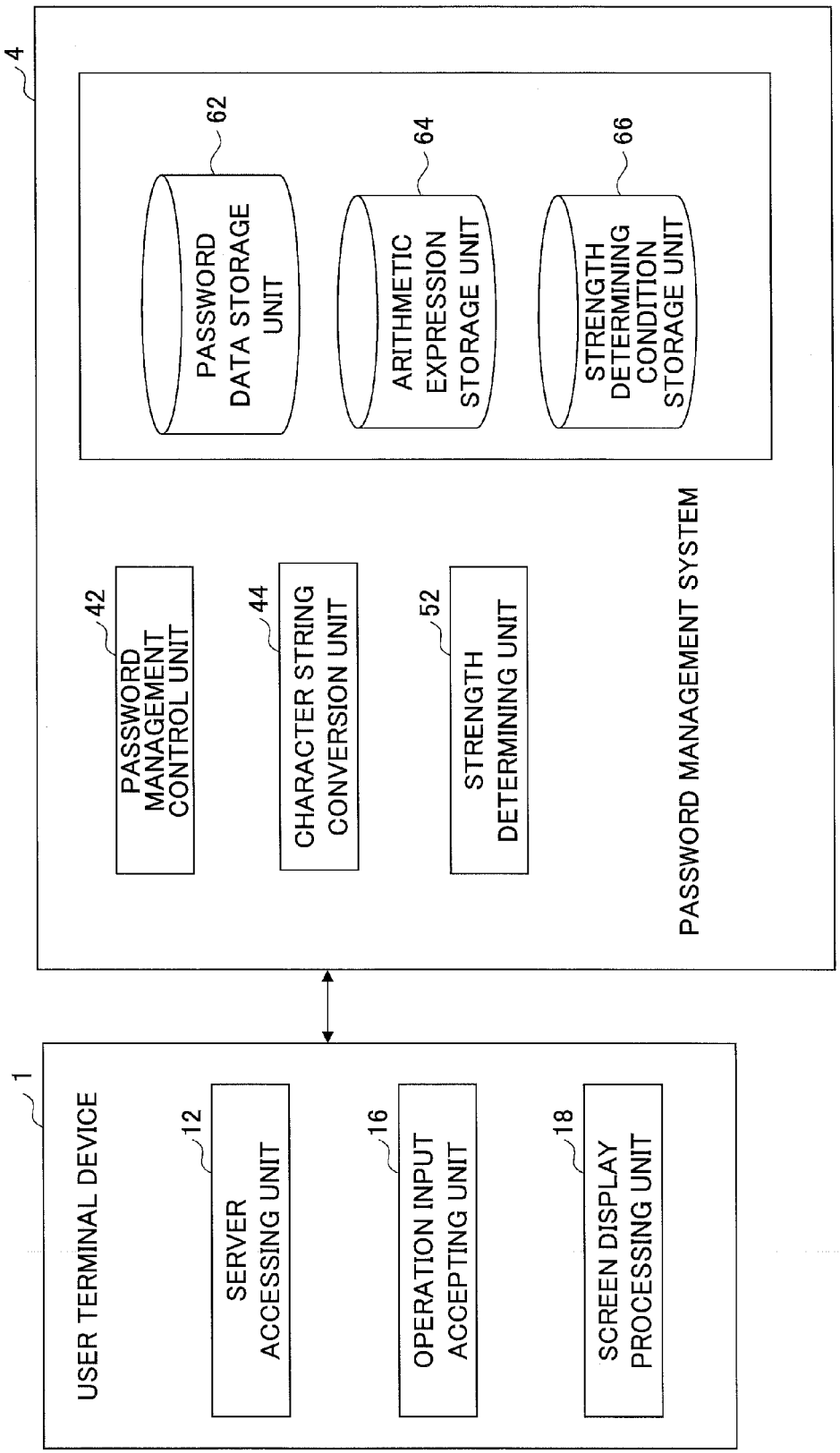
FIG. 4 is a block diagram illustrating an example of a functional structure of the user terminal apparatus and the password management system of the embodiment.

FIG. 4 is a block diagram illustrating an example of a functional structure of the user terminal apparatus 1 and the password management system 4 of the embodiment.

The user terminal apparatus 1 includes a server accessing unit 12, an operation input accepting unit 16 and a screen display processing unit 18. The operation input accepting unit 16 accepts an operation input from a user who operates the user terminal apparatus 1. The server accessing unit 12 accesses the password management system 4, sends requests to the password management system 4 and receives a processed result or the like as a response. The screen display processing unit 18 displays screens.

The password management system 4 (password management apparatus) includes a password management control unit 42, a character string conversion unit 44, a strength determining unit 52, a password data storage unit 62, an arithmetic expression storage unit 64 and a strength determining condition storage unit 66.

The password management control unit 42 controls the entirety of the password management system 4.

The password data storage unit 62 stores, for each of a plurality of users, a current password and past passwords of a plurality of generations (one generation ago to "n" generation ago). In order to ensure security, the password data storage unit 62 does not store the current password character string and the past password character strings as clear text themselves but stores as encrypted password character strings, which are different from the clear text password character strings.

Upon accepting input of user ID and a current password with a log-in instruction to the password management system 4 from a user, for example, the password management control unit 42 authenticates the user based on user ID and a current password of the user stored in the password data storage unit 62. Further, upon accepting input of a new password character string with an instruction of changing a current password from a user, the password management control unit 42 controls the character string conversion unit 44 and the strength determining unit 52 to determine the strength of the password, which will be explained later.

The character string conversion unit 44 converts a clear text password character string input by a user in accordance with predetermined encryption arithmetic expression and/or predetermined arithmetic expression. The arithmetic expression storage unit 64 stores predetermined encryption arithmetic expression, predetermined arithmetic expression and the like which are referred to by the character string conversion unit 44 when converting an input character string.

Upon accepting input of a new password character string with an instruction of changing a current password from a user, the strength determining unit 52 determines strength of the input new password character string based on a current password and past passwords of the user stored in the password data storage unit 62. The strength determining condition storage unit 66 stores a strength determining condition that is referred to by the strength determining unit 52 when the strength determining unit 52 determines the strength of the input password character string.

In this embodiment, for example, the strength determining condition storage unit 66 stores a condition that strength of a new password character string is very low so that change of the password cannot be accepted when a new password character string is the same as the current password character string of the user. Further, for example, the strength determining condition storage unit 66 stores a condition that strength of a new password character string is low so that a user is warned when a new password character string is the same as any one of past password character strings of the user.

FIG. 5 is a view illustrating an example of an internal structure of the password data storage unit 62 of the embodiment.

The password data storage unit 62 includes items (fields) such as "user ID", "current password", "past password" and the like. The "user ID" is data that uniquely identifies the user. The "current password" is an encrypted current password character string ECP that uniquely identifies a current password character string CP of the user. The "past password" is converted past password character strings CPP1 to CPPn respectively corresponding to past password character strings PP1 to PPn of the user.

As described above, the current password is used for authenticating a user when the user logs-in the password management system 4. Thus, it is necessary for the "current password" stored in the password data storage unit 62 to uniquely identify a clear text current password character string CP that is input by a user because the authentication of the user needs to be rigorously performed. Thus, the password data storage unit 62 stores the current password at a state that the original current password character string CP is converted into an encrypted current password character string ECP, which is different from the original current password character string CP, using predetermined encryption arithmetic expression E1 (fourth encryption arithmetic expression) that converts an input character string to a unique encrypted character string. The encryption arithmetic expression E1 may be one-way encryption arithmetic expression such as one-way hash function (MD function) or the like capable of giving a converted result that uniquely identifies an original character string, for example.

Meanwhile, the past password is used, when a user changes the current password to a new password, for inhibiting a registration of the new password, warning the user that the strength of the new password is low or the like if the new password matches the past password that was previously used by the user. Thus, different from the current password that is used for authenticating a user, as long as it is possible to detect the matching of the passwords to a certain accuracy based on the past password stored in the password data storage unit 62, it is unnecessary for the past password stored in the password data storage unit 62 to be capable of uniquely identifying an input new clear text password character string NP.

On the other hand, if the past password is stored as an encrypted password character string capable of uniquely identifying the original password, similarly as the current password, there may be a possibility that an original password character string is inferred when the encrypted password character string is leaked as described above. Thus, in this embodiment, the password data storage unit 62 does not store the past password character strings PP1 to PPn of the user as encrypted password character strings that are capable of uniquely identifying the original password character strings PP1 to PPn, respectively.

In this embodiment, the password data storage unit 62 stores the past passwords at a state that the original past password character strings PP1 to PPn is converted into converted past password character strings CPP1 to CPPn, which are different from the original password character strings PP1 to PPn, respectively, using predetermined arithmetic expression "e". The predetermined arithmetic expression "e" is capable of giving the same converted result for the same character string and capable of making a converted character string character string to have a plurality of (x) candidates of original character strings. The arithmetic expression "e" will be explained in detail in specific examples.

FIG. 6 is a view illustrating an example of an internal structure of the arithmetic expression storage unit 64 of the embodiment.

The arithmetic expression storage unit 64 includes items such as "target", "arithmetic expression" and the like. The "target" indicates data of a target on which arithmetic expression is performed. The "arithmetic expression" indicates arithmetic expression that is performed on the target. In FIG. 6, it is illustrated that "encryption arithmetic expression E1" is performed on "current password" and "arithmetic expression e" is performed on "past password".

Referring back to FIG. 4, specific operations of the password management control unit 42, the character string conversion unit 44 and the strength determining unit 52 are explained.

First, user authentication is explained.

Upon accepting input of user ID and a current password character string CP' with a log-in instruction to the password management system 4 from the user, the password management control unit 42 controls the character string conversion unit 44 to convert the password character string CP' to an encrypted current password character string ECP' using the encryption arithmetic expression E1 and determines whether the encrypted current password character string ECP' matches an encrypted current password character string ECP that is corresponded with the user ID in the password data storage unit 62.

When the encrypted current password character string ECP' perfectly matches (the same) the encrypted current password character string ECP, it means that the user is successfully authenticated and the password management control unit 42 allows the user to log-in the password management system 4. On the other hand, when the encrypted current password character string ECP' does not perfectly match the encrypted current password character string ECP, it means that the user fails to be authenticated and the password management control unit 42 does not allow the user to log-in the password management system 4. The password management control unit 42 does not perform additional authentication process when the user fails to be authenticated for predetermined times (five times, for example) and treat the process of the user as an error process.

Next, a process of changing a password is explained.

Upon accepting input of a new password character string NP with an instruction of changing the password from a user who logs-in the password management system 4, under the control of the password management control unit 42, the strength determining unit 52 confirms whether the new password character string NP is not the same as the current password character string CP.

Specifically, under the control of the password management control unit 42, the character string conversion unit 44 converts the new password character string NP into an encrypted password character string ENP using the encryption arithmetic expression E1.

Then, the strength determining unit 52 determines whether the encrypted password character string ENP matches an encrypted current password character string ECP corresponded with the user ID in the password data storage unit 62. When the encrypted password character string ENP and the encrypted current password character string ECP perfectly match, the strength determining unit 52 does not accept the change of the password, for example, because the strength of the new password character string NP is very low in accordance with the strength determining condition of the strength determining condition storage unit 66.

On the other hand, when the encrypted password character string ENP and the encrypted current password character string ECP do not perfectly match, under the control of the password management control unit 42, the strength determining unit 52 confirms whether the new password character string NP is the same as any of the past password character strings PP.

Specifically, the character string conversion unit 44 converts the new password character string NP into a converted input character string CNP using the above described arithmetic expression "e". Then, the strength determining unit 52 determines the strength of the new password character string NP based on the converted input character string CNP and converted past password character strings CPP1 to CPPn that are corresponded with the user ID in the password data storage unit 62.

For example, at least when the converted input character string CNP includes one of the converted past password character strings CPP1 to CPPn stored in the password data storage unit 62, the strength determining unit 52 warns the user that the strength of the input password character string NP is low in accordance with the strength determining condition of the strength determining condition storage unit 66, for example. Further, when a part of the converted input character string CNP at a predetermined position matches a part of the one of the converted past password character strings CPP1 to CPPn stored in the password data storage unit 62 at the predetermined position match, the strength determining unit 52 warns the user that the strength of the input password character string NP is low in accordance with the strength determining condition of the strength determining condition storage unit 66, for example.

The number "x" of candidates of original character strings corresponding to a single converted password character string may be determined depending on a requirement of the target password management system 4, a historical background such as improvement in computation speed or the like, or the like, but may be about more than or equal to 100 and less than or equal to 10000, for example. Specifically, the number "x" of candidates may be determined by taking the following into consideration.

First, a lower limit of "x" is explained. In a typical user authenticate system in which a user is capable of logging-in based on a password input by the user, if more than a predetermined number of input mistakes occur for a combination of a predetermined user ID and a password, it becomes impossible to further input the combination, as described above. Thus, the lower limit of "x" may be sufficiently larger than times "y" until which an input error is accepted in general user authenticate systems currently used. Depending on each system, the times "y" until which an input error is accepted may be about a single-digit such as 5 or the like in many of the systems. Thus, by setting the number "x" of candidates of original character strings corresponding to a single converted password character string to be more than or equal to about 100, for example, even when the converted password character string is leaked and corresponding password character strings are inferred, the candidates of the password character string are more than or equal to about 100. Thus, unauthorized access to systems by a third party can be prevented.

Next, an upper limit of "x" is explained. If the number "x" of candidates of original character strings corresponding to a single converted password character string is too large, when changing a password, there is a possibility that "collision", which means that a converted password character string of a new password completely matches a converted password character string of a past password, occurs even through the new password that a user is trying to newly set is completely different from the past password. If such a "collision" occurs, strength of a new password is determined to be low by a system even for the new password that is completely different from past passwords, and depending on specification of the system, the new password cannot be registered. In particular, in a system in which the number of registered users is large and password data of a large number of users are stored, possibility of occurrence of accidental "collision" becomes high. Thus, it is necessary to set the upper limit of "x" to an extent that frequency of occurrence of "collision" does not become a problem in an actual operation of the system.

As described above, according to the password management system 4 of the embodiment, while the converted past password character strings CPP1 to CPPn of past password character strings are stored in order to increase the strength of the password, each of the converted past password character strings CPP1 to CPPn is configured such that a plurality of original character string candidates exist. Thus, even if the converted past password character strings CPP1 to CPPn are leaked and corresponding original character strings are inferred, as a plurality of original password character string candidates exist for each of the converted past password character strings CPP1 to CPPn, it is difficult to uniquely identify an actual original password character string. As described above, in a general user authenticate system, it is set that a combination of a predetermined user ID and a password cannot be accepted after the combination is tried for predetermined times in error. Thus, according to the password management system 4 of the embodiment, stronger security can be ensured against a list-type attack by which listed up password character string candidates for a predetermined user ID are used to attack another system. Thus, unauthorized access to another system can be prevented as well.

Specific examples are explained.

Example 1

In this example, the password data storage unit 62 may store, for each past password, a character string obtained by, first, obtaining a hash value of an original password character string using one-way hash function (MD function) and then extracting a part of the hash value, as the converted password character string of the original password character string, for example. In other words, the password data storage unit 62 does not store the entirety of the hash value.

FIG. 7 is a view illustrating an example of an internal structure of the arithmetic expression storage unit 64 of the example.

The converted past password character string CPP stored in the password data storage unit 62 may be obtained by, first, converting an input character string into an encrypted character string capable of uniquely identifying the input character string using encryption arithmetic expression E2 (first encryption arithmetic expression) and then extracting a part of the encrypted character string in accordance with a first rule R1. Thus, in this example, the arithmetic expression "e" is a combination of the encryption arithmetic expression E2 and the first rule R1 where the encryption arithmetic expression E2 is performed and then the first rule R1 is performed.

Further, the converted input character string CNP may be an encrypted character string obtained by converting a new password character string NP using the encryption arithmetic expression E2, or may be a converted character string obtained by extracting a part of the encrypted character string in accordance with the first rule R1.

The encryption arithmetic expression E2 may be one-way encryption arithmetic expression such as one-way hash function (MD function) or the like capable of giving a converted result that uniquely identifies an original string, for example. The encryption arithmetic expression E2 and the encryption arithmetic expression E1 that is performed on the current password character string may be the same, or may be different. The first rule R1 may be a rule that defines the position and the number of digits (r digits) of a character string that is to be extracted from the encrypted character string encrypted by the encryption arithmetic expression E2. The first rule R1 may be a rule such as "r digits of the end", "from a1 digit to a2 digit, from the front" or the like, for example.

An example of determining the first rule R1 (how many digits (r digit) are extracted as the character string) is explained.

For example, it is assumed that the password character string is a character string of 8 digits using 62 kinds of alphanumeric characters, and the encryption arithmetic expression E2 is capable of converting an input password character string to an encrypted character string of hexadecimal 32 digits that uniquely identifies the input password character string. In this case, the total of expected password character strings becomes about $2.18 \times 10^{14}$. Further, the total of encrypted character strings becomes about $3.40 \times 10^{38}$.

First, for example, a case is explained in which the first rule R1 is to extract a part (6 digits, for example) of the above described encrypted character string at a predetermined position (the end, for example) to obtain the converted password character string. In this case, the total of obtained converted password character strings becomes about $1.68 \times 10^7$.

When a completely random calculated result is obtained, the password character string is always converted to any of the converted password character strings. Thus, the number "x" of candidates of original password character strings corresponding to a single converted password character string becomes as follows.

$x \approx$(the total of the password character strings)/(the total of the converted password character strings)=(about $2.18 \times 10^{14}$)/(about $1.68 \times 10^7$)=about $1.30 \times 10^7$.

On the other hand, the probability "p" of the occurrence of the above described "collision" for a password character string that is to be newly set is (the number of candidates of original password character strings corresponding to a single converted password character string "x")/(the total of password character strings)=(about $1.30 \times 10^7$)/(about $2.18 \times 10^{14}$)=$5.96 \times 10^{-8}$.

The probability "pn" of the occurrence of the above described "collision" for a password character string that is to be newly set when the passwords of a plurality of generations (one generation ago to n generation ago) is (the number of generations "n")×(the number of candidates of original password character strings corresponding to a single converted password character string "x")/(the total of password character strings)=n×(about $1.30 \times 10^7$)/(about $2.18 \times 10^{14}$)=n×$5.96 \times 10^{-8}$.

As described above, when the converted password character string is obtained by extracting a part (6 digits, for example) of the above described encrypted character string at a predetermined position (the end, for example), the number "x" of candidates of the original password character strings corresponding to a single converted password character string becomes about $1.30 \times 10^7$ so that strong security can be ensured against a list-type attack. On the other hand, in a system for which the number of registered users is large, and in which data of passwords of a large number of users are stored, the "collision" that occurs by coincidence may be a problem.

Then, for example, a case is explained in which the first rule R1 is to extract a part (7 digits, for example) of the above described encrypted character string at a predetermined position (the end, for example) to obtain the converted password character string. In this case, the number "x" of candidates of original password character strings corresponding to a single converted password character string becomes $x \approx$(the total of the password character strings)/(the total of the converted password character strings)=(about $2.18 \times 10^{14}$)/(about $1.10 \times 10^{12}$)= about 198.

As such, in the case when a part (7 digits, for example) of the above described encrypted character string at a predetermined position (the end, for example) is extracted to obtain the converted password character string, the number "x" of candidates of original password character strings corresponding to a single converted password character string becomes about 198 so that strong security can still be ensured against a list-type attack.

On the other hand, the probability "p" of the occurrence of the above described "collision" for a password character string that is to be newly set is (the number of candidates of original password character strings corresponding to a single converted password character string "x")/(the total of password character strings)=(about 198)/(about $2.18 \times 10^{14}$)=$9.08 \times 10^{-13}$. Thus the probability "p" of the occurrence of the above described "collision" can be sufficiently small compared with the case in which the first rule R1 is to extract a part (6 digits, for example) of the above described encrypted character string at a predetermined position (the end, for example) to obtain the converted password character string.

As described above, the number of digits (the number of "r") of the converted past password character string CPP stored in the password data storage unit 62 may be determined in accordance with an assumable risks, level of measurement or the like.

FIG. 8 is a view illustrating an example of an internal structure of the password data storage unit 62 of the embodiment.

Similar to the example illustrated in FIG. 5, the password data storage unit 62 includes items such as "user ID", "current password", "past password" and the like. The password data storage unit 62 may store an encrypted password character string of 32 digits for the "current password", for example. Meanwhile, the password data storage unit 62 may store a converted password character string that is obtained by extracting the end r digit from the encrypted password character string of 32 digits for the "past password", for example.

Figure 9:
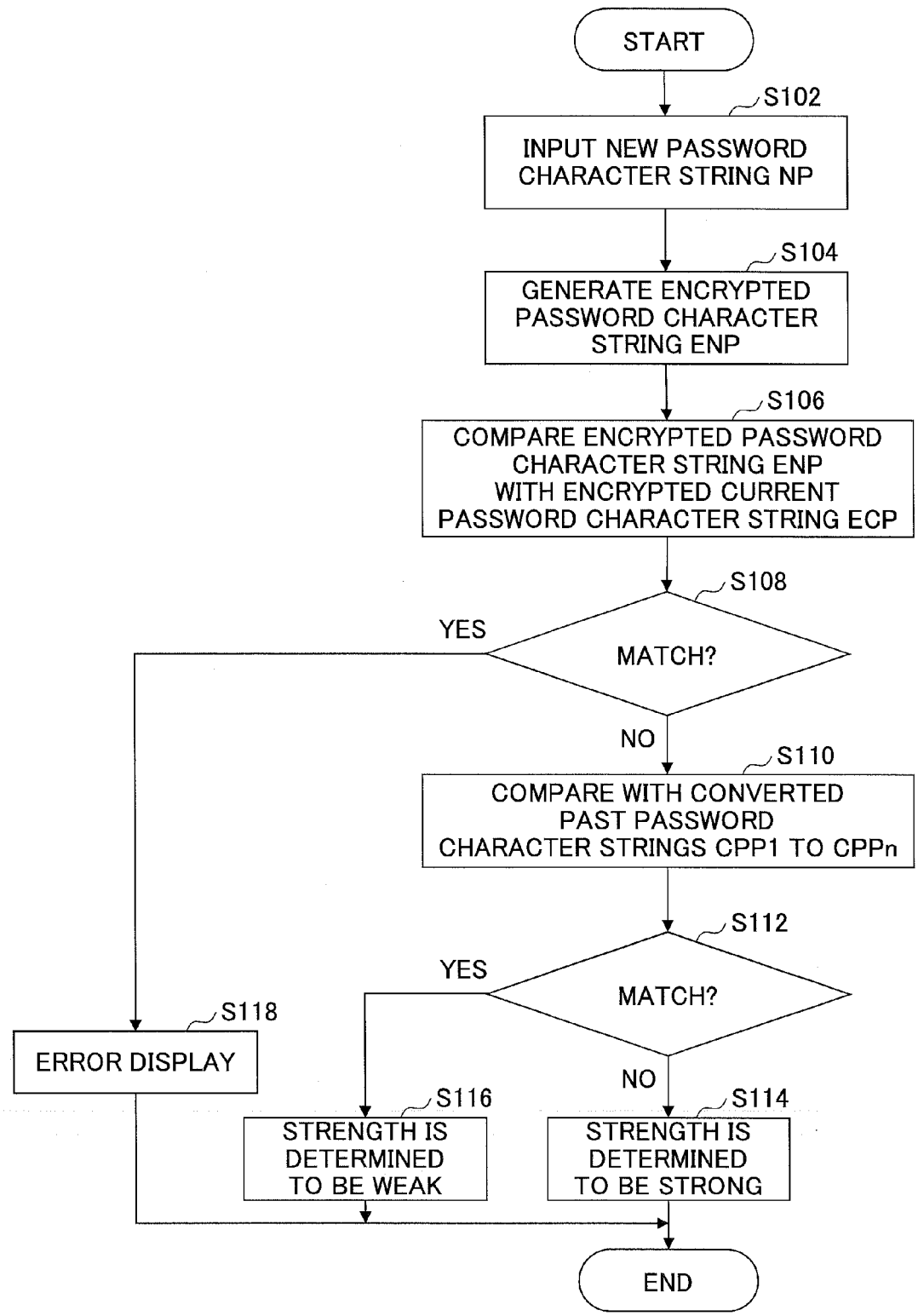
FIG. 9 is a flowchart illustrating an example of a process of the password management system of the embodiment.

FIG. 9 is a flowchart illustrating an example of a process of the password management system 4 of the embodiment. Here, an example is explained in which the encryption arithmetic expression E1 that is performed on the current password character string stored in the password data storage unit 62 and the encryption arithmetic expression E2 that is performed on the past password character strings are the same.

Upon accepting input of a new password character string NP with an instruction of changing a password from a user who logs-in the password management system 4 (step S102), under the control of the password management control unit 42, the character string conversion unit 44 converts the new password character string NP into an encrypted password character string ENP using the encryption arithmetic expression E1 (=encryption arithmetic expression E2) (step S104).

Then, the strength determining unit 52 determines whether the encrypted password character string ENP matches the encrypted current password character string ECP that is corresponded with the user ID in the password data storage unit 62 (step S106). When the encrypted password character string ENP perfectly matches the encrypted current password character string ECP (YES in step S108), the strength determining unit 52 does not accept the change of the password as the strength of the new password character string NP is very low and displays an error, for example, in accordance with the strength determining condition of the strength determining condition storage unit 66 (step S118).

On the other hand, when the encrypted password character string ENP and the encrypted current password character string ECP do not perfectly match (NO in step S108), the strength determining unit 52 determines whether the new password character string NP matches the past password character strings of the user.

As an example, the strength determining unit 52 uses the encrypted password character string ENP as it is as the converted input character string CNP. The strength determining unit 52 determines whether any one of the converted past password character strings CPP1 to CPPn stored in the password data storage unit 62 is included in the encrypted password character string ENP (step S110).

When any one of the converted past password character strings CPP1 to CPPn stored in the password data storage unit 62 is included in the encrypted password character string ENP (YES in step S112), this means that the character string extracted from the encrypted password character string ENP in accordance with the first rule R1 matches any one of the converted past password character strings CPP1 to CPPn, and the possibility that the input new password character string NP is the same as the past password character string is very high. Thus, the strength determining unit 52 determines that the strength of the input new password character string NP is low and warns the user, for example (step S116).

On the other hand, when any one of the converted past password character strings CPP1 to CPPn stored in the password data storage unit 62 is not included in the encrypted password character string ENP (NO in step S112), the strength determining unit 52 determines that the strength of the input new password character string NP is high and outputs the result (step S114).

As another example, in step S110, the character string conversion unit 44 may extract a part of the encrypted password character string ENP in accordance with the first rule R1. Then, the strength determining unit 52 may use the extracted part as the converted input character string CNP, and determine whether the extracted part and any one of the converted past password character strings CPP1 to CPPn stored in the password data storage unit 62 match (step S110).

When the extracted part and any one of the converted past password character strings CPP1 to CPRn stored in the password data storage unit 62 match (YES in step S112), the strength determining unit 52 determines that the strength of the input new password character string NP is low (step S116). On the other hand, when the extracted part and any one of the converted past password character strings CPP1 to CPPn stored in the password data storage unit 62 do not match (NO in step S112), the strength determining unit 52 determines that the strength of the input new password character string NP is high (step S114).

Here, when the encryption arithmetic expression E1 that is performed on the current password character string stored in the password data storage unit 62 and the encryption arithmetic expression E2 that is performed on the past password character strings are different, in step S110, under the control of the password management control unit 42, the character string conversion unit 44 performs the above procedure after converting the new password character string NP into an encrypted password character string using the encryption arithmetic expression E2.

Example 2

In this example, the converted past password character string CPP stored in the password data storage unit 62 may be obtained by, first, dividing the input character string into a plurality of character strings in accordance with a second rule R2, then, converting each of the plurality of character strings into an encrypted character string capable of uniquely identifying the original character string using encryption arithmetic expression E3 (second encryption arithmetic expression), and thereafter, combining a part of each of the converted encrypted character strings in accordance with a third rule R3. Thus, in this example, the above described arithmetic expression "e" may be a combination of the second rule R2, the encryption arithmetic expression E3 and the third rule R3 performed in this order.

The character string conversion unit 44 may treat a character string obtained by, dividing the new password character string NP into a plurality of character strings in accordance with the second rule R2, converting each of the plurality of character strings into an encrypted character string that uniquely identifies the original character string using the encryption arithmetic expression E3, and combining a part of each of the converted encrypted character strings in accordance with the third rule R3, as the converted input character string CNP.

The second rule R2 may be a rule that defines how to divide a character string before being converted. For example, the second rule R2 may be a rule that defines to divide a character string by a predetermined number of digits from the front. In this case, for example, when it is assumed that a character string before being converted is "password" and a predetermined digit number "s" is 2, the character string conversion unit 44 divides the "password" to "pa", "ss", "wo" and "rd".

The encryption arithmetic expression E3 may be one-way encryption arithmetic expression such as one-way hash function (MD function) or the like capable of giving a converted result that uniquely identifies an original character string, for example. The encryption arithmetic expression E3 and the above described encryption arithmetic expression E1 that is performed on the current password character string may be the same, or may be different. The character string conversion unit 44 converts "pa", "ss", "wo" and "rd" into encrypted character strings "E(pa)", "E(ss)", "E(wo)" and "E(rd)", respectively, using the encryption arithmetic expression E3.

The third rule R3 may be a rule that defines the position and the number of digits (r2) of a character string that is to be extracted from each of the encrypted character strings converted using the encryption arithmetic expression E3, and how to combine the extracted character strings. The third rule R3 may be a rule such as "r2 digits of the end", "from a3 digit to a4 digit, from the front" or the like, for example.

The character string conversion unit 44 extracts a part (r2 digits) at a predetermined position of each of the encrypted character strings "E(pa)", "E(ss)", "E(wo)" and "E(rd)" as character strings "C(pa)", "C(ss)", "C(wo)" and "C(rd)", respectively. Then, the character string conversion unit 44 combines the extracted character strings "C(pa)", "C(ss)", "C(wo)" and "C(rd)" in a predetermined order. The order of combining may be the same as the order of the original character strings "C(pa)", "C(ss)", "C(wo)" and "C(rd)", for example. Thus, the converted past password character string CPP stored in the password data storage unit 62 may be a character string such as "C(pa)C(ss)C(wo)C(rd)", for example.

Even with the above configuration, as each of the character strings "C(pa)", "C(ss)", "C(wo)" and "C(rd)" is obtained by extracting a part from each of the encrypted character strings "E(pa)", "E(ss)", "E(wo)" and "E(rd)", respectively, a plurality of original character string candidates exist for a single converted password character string.

Further, with this configuration, as it is possible to detect a partial matching of an input password character string and the past password character string stored in the password data storage unit 62, the strength determining unit 52 is capable of warning or the like when the user tries to register a password that partially matches a past password that was previously used. For example, when it is assumed that the past password character string is "pass1122" and a new password to be registered is "pass3344", converted character strings after being converted using the above described arithmetic expression "e" become "C(pa)C(ss)C(11)C(22)" and "C(pa)C(ss)C(33)C(44)", respectively. This means that the former parts of these character strings match with each other. As such, in this example, the strength determining unit 52 is capable of warning or the like when the user tries to register a password that partially matches a past password that was previously used.

Example 3

In this example, the converted past password character string CPP stored in the password data storage unit 62 may be obtained by, first, extracting a part of the input character string in accordance with a fourth rule R4, and then converting the extracted character string into an encrypted character string capable of uniquely identifying the original character string using encryption arithmetic expression E4 (third encryption arithmetic expression). Thus, in this example, the above described arithmetic expression "e" may be a combination of the fourth rule R4 and the encryption arithmetic expression E4 performed in this order.

The character string conversion unit 44 may treat an encrypted character string obtained by, extracting a part of the new password character string NP in accordance with the fourth rule R4, and converting the extracted character string by the encryption arithmetic expression E4, as the converted input character string CNP.

The fourth rule R4 may be a rule that defines the position and the number of digits (r3) of a character string that is to be extracted from the original character string. The fourth rule R4 may be a rule such as "r3 digits of the end", "a5 digit to a6 digit, from the front" or the like, for example. For example, when it is assumed that an original character string is "password" and the fourth rule R4 is "4 digits of the end", the character string conversion unit 44 extracts "word" from the "password". Here, the number of digits (r3) of a character string is to be extracted may be determined such that a plurality of (x) original character string candidates exist for the converted character string.

The encryption arithmetic expression E4 may be one-way encryption arithmetic expression such as one-way hash function (MD function) or the like capable of giving a converted result that uniquely identifies an original character string, for example. The encryption arithmetic expression E4 and the above described encryption arithmetic expression E1 that is performed on the current password character string may be the same, or may be different.

Even with the above configuration, a plurality of original character string candidates exist for a single converted password character string.

Example 4

Here, as there is a possibility that security may be lowered such that the encryption arithmetic expression is read (decoded) due to an improvement of calculation speed of computers or the like, as described above, new encryption techniques have always been developed. Thus, when the password management system 4 is configured to store the past passwords of the plurality of generations (one generation ago to "n" generation ago), as described above, there may be a possibility that different arithmetic expressions may be used as the above described arithmetic expression "e" depending on time when the passwords are stored.

Here, it is assumed that a first past password character string PP1 is converted to a first converted past password character string CPP1 using a predetermined first arithmetic expression "e1" that is capable of giving the same converted result for the same character string and capable of making a converted character string character string to have a plurality of candidates of original character strings. Similarly, it is assumed that a second past password character string PP2, which is older generation than the first past password character string PP1, is converted to a second converted past password character string CPP2 using a predetermined second arithmetic expression "e2" that is capable of giving the same converted result for the same character string and capable of making a converted character string character string to have a plurality of candidates of original character strings. In such a case, the password data storage unit 62 may store, for each user, the first converted past password character string CPP1 and the second converted past password character string CPP2, and data indicating the predetermined first arithmetic expression "e1" and the predetermined second arithmetic expression "e2" corresponded with the converted past password character string CPP1 and the second converted past password character string CPP2, respectively.

Upon accepting input of a new password character string NP with ab instruction of changing the password from a user, the character string conversion unit 44 converts the new password character string NP to a first converted input character string CNP1 and a second converted input character string CNP2, that are different from the password character string NP, based on the predetermined first arithmetic expression "e1" and the predetermined second arithmetic expression "e2", respectively.

The strength determining unit 52 may determine strength of the new password character string NP based on the first converted input character string CNP1 and the first converted past password character string CPP1, and based on the second converted input character string CNP2 and the second converted past password character string CPP2.

FIG. 10 is a view illustrating an example of an internal structure of the password data storage unit 62 of the example.

Here, similar to the example illustrated in FIG. 5, the password data storage unit 62 includes items such as "user ID", "current password", "past password" and the like. For the "past password", the converted past password character strings CPP1 to CPPn corresponding to the past password character string PP1 to PPn of the user are corresponded with data indicating arithmetic expressions "e1" and "e2" used for obtaining the converted past password character strings CPP1 to CPPn, for each generation. The data indicating arithmetic expression "e1" and "e2" may not be arithmetic expressions themselves, or alternatively, may be ID or the like that specify the arithmetic expressions, respectively.

Normally, security of the predetermined second arithmetic expression "e2" that is corresponded with the converted password character string of a past password of an older generation is lower than that of the predetermined first arithmetic expression "e1". Thus, when determining strength of an input password, the strength determining unit 52 may give different values to the past passwords depending on the generation such as the past password of older generation is used as just reference or the like. Specifically, the strength determining unit 52 may determine strength of a new password character string NP by giving a high weight to a determined result based on the first converted input character string CNP1 and the first converted past password character string CPP1 than a determined result based on the second converted input character string CNP2 and the second converted past password character string CPP2. Such a condition is stored in the strength determining condition storage unit 66.

Each component illustrated in FIG. 4 indicates a block of a functional unit, not a hardware unit. The individual constituents of the user terminal apparatus 1 and the password management system 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications. The functions performed by the password management system 4 may not be performed in a single apparatus, and may be performed by a plurality of distributed apparatuses.

According to the embodiment, a technique capable of preventing unauthorized accesses to other systems even when a password is leaked while storing data regarding past passwords in order to increase the strength of the password can be provided.

Although a preferred embodiment of the password management system has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. A password management system comprising:
    a processor; and
    a memory storing instructions that, when executed, cause the processor to function as;
        a character string conversion unit that converts an input character string to a character string different from the input character string using a predetermined arithmetic expression,
        the predetermined arithmetic expression being configured to satisfy both (i) giving a same converted result for a same character string and (ii) converting a character string such that a plurality of original character string candidates exist for a converted character string at the same time,
        the predetermined arithmetic expression including, as a part, an encryption arithmetic expression capable of converting an input character string to an encrypted character string that uniquely identifies the input character string,
        a password data storage unit that stores a converted past password character string CPP that is a converted state of a past password character string PP of a user using the predetermined arithmetic expression and is different from the past password character string PP,
    the converted past password character string CPP being configured to satisfy both (iii) the same converted result is given when the past password character string PP is converted using the predetermined arithmetic expression again and (iv) a plurality of original character string candidates, including the past password character string PP, exist for the converted past password character string CPP at the same time, and
        a strength determining unit that determines strength of a password,
    wherein upon accepting input of a new password character string NP with an instruction of changing a current password, the character string conversion unit converts the new password character string NP to a converted input character string CNP different from the new password character string NP using the predetermined arithmetic expression or the encryption arithmetic expression, and
    wherein the strength determining unit determines strength of the new password character string NP based on the converted input character string CNP and the converted past password character string CPP of the user stored in the password data storage unit.

2. The password management system according to claim 1, wherein the converted past password character string CPP stored in the password data storage unit is obtained by converting the past password character string PP to an encrypted character string using a first encryption arithmetic expression that converts an input character string to an encrypted character string that uniquely identifies the input character string and extracting a part of the encrypted character string in accordance with a first rule, and
    wherein the converted input character string CNP is a character string obtained by converting the new password character string NP to an encrypted new password character string using the first encryption arithmetic expression and extracting a part of the encrypted new password character string in accordance with the first rule, or the encrypted new password character string obtained by converting the new password character string NP using the first encryption arithmetic expression.

3. The password management system according to claim 2, wherein the converted input character string CNP is the encrypted new password character string obtained by converting the new password character string NP using the first encryption arithmetic expression, and wherein the strength determining unit determines that the strength of the new password character string NP is low when the converted past password character string CPP of the user stored in the password data storage unit is included in the converted input character string CNP.

4. The password management system according to claim 2, wherein the converted input character string CNP is the character string obtained by converting the new password character string NP to the encrypted new password character string using the first encryption arithmetic expression and extracting the part of the encrypted new password character string in accordance with the first rule, and wherein the strength determining unit determines that the strength of the new password character string NP is low when the converted input character string CNP and the converted past password character string CPP of the user stored in the password data storage unit match.

5. The password management system according to claim 2, wherein the password data storage unit stores an encrypted current password character string ECP that is an encrypted state of a current password character string CP of the user using a fourth encryption arithmetic expression and is different from the password character string CP, with the converted past password character string CPP, the fourth encryption arithmetic expression converting an input character string to an encrypted character string that uniquely identifies the input character string, and wherein the fourth encryption arithmetic expression is the same as the first encryption arithmetic expression.

6. The password management system according to claim 1, wherein the converted past password character string CPP stored in the password data storage unit is obtained by dividing an input character string into a plurality of character strings in accordance with a second rule, converting each of the plurality of character strings to an encrypted character string using a second encryption arithmetic expression, and combining a part of each of the encrypted character strings in accordance with a third rule, the second encryption arithmetic expression converting an input character string to an encrypted character string that uniquely identifies the input character string, and wherein the converted input character string CNP is a character string obtained by dividing the new password character string NP into a plurality of character strings in accordance with the second rule, converting each of the plurality of character strings to an encrypted character string using the second encryption arithmetic expression, and combining a part of each of the converted encrypted character strings in accordance with the third rule.

7. The password management system according to claim 1, wherein the converted past password character string CPP stored in the password data storage unit is obtained by extracting a part of an input character string in accordance with a fourth rule, and converting the extracted character string to an encrypted character string that uniquely identifies the extracted character string using a third encryption arithmetic expression, the third encryption arithmetic expression converting an input character string to an encrypted character string that uniquely identifies the input character string, and wherein the converted input character string CNP is an encrypted character string obtained by extracting a part of the new password character string NP in accordance with the fourth rule, and converting the extracted character string using the third encryption arithmetic expression.

8. The password management system according to claim 1, wherein the password data storage unit stores an encrypted current password character string ECP that is an encrypted state of a current password character string CP of the user using a fourth encryption arithmetic expression and is different from the password character string CP, with the converted past password character string CPP, the fourth encryption arithmetic expression converting an input character string to an encrypted character string that uniquely identifies the input character string.

9. The password management system according to claim 1, wherein the password data storage unit stores a first converted past password character string CPP1 and a second converted past password character string CPP2 obtained by converting a first past password character string PP1 and a second past password character string PP2 using a predetermined first arithmetic expression and a predetermined second arithmetic expression, respectively, corresponded with data indicating the predetermined first arithmetic expression and the predetermined second arithmetic expression, the second past password character string PP2 being an older generation than the first past password character string PP1, each of the predetermined first arithmetic expression and the predetermined second arithmetic expression being capable of giving a same converted result for a same character string and capable of converting a character string such that a plurality of original character string candidates exist for a converted character string, each the predetermined first arithmetic expression and the predetermined second arithmetic expression including, as a part, an encryption arithmetic expression capable of converting an input character string to an encrypted character string that uniquely identifies the input character string, wherein upon accepting input of a new password character string NP with an instruction of changing a current password, the character string conversion unit converts the new password character string NP to a first converted input character string CNP1 different from the new password character string NP using the predetermined first arithmetic expression or the encryption arithmetic expression included in the predetermined first arithmetic expression, and converts the new password character string NP to a second converted input character string CNP2 different from the new password character string NP using the predetermined second arithmetic expression or the encryption arithmetic expression included in the predetermined second arithmetic expression, and wherein the strength determining unit determines strength of the new password character string NP based on the first converted input character string CNP1 and the first converted past password character string CPP1, and the second converted input character string CNP2 and the second converted past password character string CPP2.

10. The password management system according to claim 9,
wherein security of the predetermined second arithmetic expression is lower than that of the predetermined first arithmetic expression, and
wherein the strength determining unit determines the strength of the new password character string NP by giving a higher weight to a determined result based on the first converted input character string CNP1 and the first converted past password character string CPP1 than a determined result based on the second converted input character string CNP2 and the second converted past password character string CPP2.

11. A non-transitory computer-readable recording medium having recorded thereon a program for a password management system that causes a computer to execute a method comprising:
converting an input character string to a character string different from the input character string using a predetermined arithmetic expression,
the predetermined arithmetic expression being configured to satisfy both (i) capable of giving a same converted result for a same character string and (ii) capable of converting a character string such that a plurality of original character string candidates exist for a converted character string at the same time,
the predetermined arithmetic expression including, as a part, an encryption arithmetic expression capable of converting an input character string to an encrypted character string that uniquely identifies the input character string,
storing a converted past password character string CPP that is a converted state of a past password character string PP of a user using the predetermined arithmetic expression and is different from the past password character string PP in a password data storage unit,
the converted past password character string CPP being configured to satisfy both (iii) the same converted result is given when the past password character string PP is converted using the predetermined arithmetic expression again and (iv) a plurality of original character string candidates, including the past password character string PP, exist for the converted past password character string CPP at the same time; and
determining strength of a password,
wherein in the converting, upon accepting input of a new password character string NP with an instruction of changing a current password, converting the new password character string NP to a converted input character string CNP different from the new password character string NP using the predetermined arithmetic expression or the encryption arithmetic expression, and
wherein in the determining, determining strength of the new password character string NP based on the converted input character string CNP and the converted past password character string CPP of the user stored in the password data storage unit.

* * * * *